United States Patent
Cheng (10) Patent No.: US 10,821,381 B2
(45) Date of Patent: Nov. 3, 2020

(54) DRINKING WATER FILTRATION DEVICE AND FILTRATION METHOD BASED ON GRAPHENE TECHNOLOGIES

(71) Applicant: SHAOGUAN UNIVERSITY, Shaoguan, Guangdong (CN)

(72) Inventor: Jinsheng Cheng, Guangdong (CN)

(73) Assignee: SHAOGUAN UNIVERSITY, Shaoguan (CN)

( * ) Notice: Subject to any disclaimer, the term of this patent is extended or adjusted under 35 U.S.C. 154(b) by 244 days.

(21) Appl. No.: 16/119,029

(22) Filed: Aug. 31, 2018

(65) Prior Publication Data

US 2019/0070533 A1 Mar. 7, 2019

(30) Foreign Application Priority Data

Sep. 1, 2017 (CN) .......................... 2017 1 0777769

(51) Int. Cl.
*C02F 1/28* (2006.01)
*B01D 29/56* (2006.01)
(Continued)

(52) U.S. Cl.
CPC ......... *B01D 29/56* (2013.01); *B01D 39/2055* (2013.01); *C02F 1/003* (2013.01);
(Continued)

(58) Field of Classification Search
None
See application file for complete search history.

(56) References Cited

U.S. PATENT DOCUMENTS

2012/0168367 A1* 7/2012 Fu .......................... C02F 9/005
                                                                 210/287

FOREIGN PATENT DOCUMENTS

CN       103357388 A    10/2013
CN       103464097 A    12/2013
WO   WO-2018078427 A1 *  5/2018  .............. B01J 20/14

OTHER PUBLICATIONS

Jinsheng Cheng et al. , Facile Synthesis of Three-Dimensional Chitosan-Graphene Mesostructures for Reactive Black 5Removal. Carbohydr.Polym. «Carbohydrate Polymers» , 2012 , 88 (1) :61-67.
(Continued)

*Primary Examiner* — Matthew O Savage
(74) *Attorney, Agent, or Firm* — Wayne & Ken, LLC; Tony Hom (57) ABSTRACT

The present invention relates to a drinking water filtration device based on a graphene technologies. The filtration device includes a first filter, a second filter and a faucet. The first filter further includes a first filter element and a first filter element casing. The second filter includes a second filter element and a second filter element casing. A water inlet of the second filter element casing is connected with a water outlet of the first filter element casing. The filtration material of the second filter element is a mixture of graphene oxide-superparamagnetic nanoparticles composites and graphene reinforced diatom ceramic material. A water inlet of the faucet is connected with a water outlet of the second filter element casing. The filtration device of the present invention can fully eliminate various pollutants in drinking water, and has the advantages of simple structure, good filtration effect and high purification efficiency.

10 Claims, 3 Drawing Sheets

(51) Int. Cl.
  *C02F 9/00*      (2006.01)
  *C02F 1/02*      (2006.01)
  *B01D 39/20*     (2006.01)
  *C02F 1/00*      (2006.01)
(52) U.S. Cl.
  CPC ................ *C02F 1/02* (2013.01); *C02F 9/005* (2013.01); *B01D 2201/302* (2013.01); *C02F 1/001* (2013.01); *C02F 1/283* (2013.01); *C02F 1/288* (2013.01); *C02F 2305/08* (2013.01); *C02F 2307/06* (2013.01)

(56) References Cited

OTHER PUBLICATIONS

Zou X, Zhang L, Wang Z, et al. Mechanisms of the Antimicrobial Activities of Graphene Materials.[J].Journal of the American Chemical Society, Jan. 29, 2016.
F.Perreault, M.E.Tousley, M.Elimelech.Thin-Film Composite Polyamide Membranes Functionalized with Biocidal Graphene Oxide Nanosheets. Environ.Sci.Technol.Lett.,2014,1(1),71-76).

* cited by examiner

DRINKING WATER FILTRATION DEVICE AND FILTRATION METHOD BASED ON GRAPHENE TECHNOLOGIES

CROSS-REFERENCE TO RELATED APPLICATIONS

This application claims to Chinese application No. 2017/10,777,769.8 with a filing date of Sep. 1, 2018. The content of the aforementioned applications, including any intervening amendments thereto, are incorporated herein by reference.

TECHNICAL FIELD

The present invention relates to a drinking water filtration technologies, and particularly relates to a drinking water filtration device and filtration method based on graphene technologies.

BACKGROUND

Water is the source of life, and getting safe drinking water is a basic human demand for survival. Drinking water refers to drink water and living water for people to live. The existing Sanitary Standard for Drinking Water (GB5749-2006) in China specifies strict sanitation requirements for the quality of the drinking water, that is: the drinking water has a good sensory property, is transparent, colorless, odorless and free of foreign odor and visible substances, is epidemiologically safe, does not contain pathogenic microorganisms and parasitic ovums, and has a chemical constitution harmless to people. Chemical substances included in the water do not cause acute poisoning, chronic poisoning and long-term harm to human bodies. However, the situation of drinking water safety is still quite severe in China. With fast promotion of industrialization and urbanization, pollution to drinking water sources in a lot of cities and areas around industrial parks of these cities is aggravated. Excessive residual chlorine in tap water of some cities is prominent, and drinking water in some rural areas is bitter and salty or contains high fluorine, high arsenic, *Escherichia coli*, schistosome pathogens and the like, thereby constituting a serious threat to the health of people.

Generally speaking, possible pollutants of the drinking water include inorganic residual pollutants such as fluorine, lead, chromium, cadmium, mercury, arsenic, residual chlorine, arsenate and sulfate radical, organic residual pollutants such as humic acid, chloralkane, volatile organic compounds (VOCs), nitrosamine, chlorobenzene, bromobenzene, chlorine symtriazine, bentazone, chlorophenol and nitrogen-containing phenol, and pathogenic bacteria such as *Escherichia coli, cholera* bacteria, *Shigella dysenteriae, salmonella, klebsiella* and *Schistosome* pathogens. However, an existing single heating boiling, chemical adding purification or filtering purification method cannot remove all types of the above-mentioned pollutants, so that it is hard to fulfill an aim of deep purification. Therefore, it is necessary to design a systematic integrated deep purification method.

Graphene is a novel material of a monolayer sheet structure composed of carbon atoms, and is a hexagonal honeycomb lattice-shaped planar thin film composed of the carbon atoms through an $sp^2$ hybridized orbital. The graphene has excellent electrical property, thermal property, mechanical property and the like, and has a theoretical specific surface area of 2630 $m^2/g$. Nanomaterial based on the graphene has an extremely large specific surface area, a nano-scale aperture and excellent properties such as surface electrical characteristic and functional modification, has been gradually applied to water purification work, and increasingly shows its advantages and potential (Jinsheng Cheng et al. Facile Synthesis of Three-Dimensional Chitosan-Graphene Mesostructures for Reactive Black 5 Removal. Carbohydr.Polym., 2012, 88(1), 61-67; Lin Yaopeng, Zhang Xu and Wu Jun, a graphene sewage purifier; CN 103464097; Liu Wei, Zhao Jie and Yang Lijuan, a preparation method of cyclodextrin-graphene microspheres for water purification [J], industrial water treatment, 2013 (12): 73-73). It should be noted that the surface of the graphene or graphene oxide has unique characteristics, so that bacteria can be effectively killed or growth of the bacteria can be effectively suppressed (Zou X, Zhang L, Wang Z, et al. Mechanisms of the Antimicrobial Activities of Graphene Materials [J]. Journal of the American Chemical Society, 2016, 138(7):2064-2077; F. Perreault, M. E. Tousley, M. Elimelech. Thin-Film Composite Polyamide Membranes Functionalized with Biocidal Graphene Oxide Nanosheets. Environ. Sci. Technol. Lett., 2014, 1(1), 71-76). In addition, the research showed that some paramagnetic metal particles also have relatively good sterilization effect and can be used for inactivating pathogenic bacteria (Yang Song, Preparation, functionalization and mechanism researches on magnetic hollow/porous nano composite microspheres[D]. University of Science and Technology of China, 2009.).

However, most of existing reports on use of graphene for water purification focus on sewage purification methods, or purification methods for a single type of water pollutants. There is no purification equipment or method for drinking water, designed on the basis of the characteristics of the graphene, or there is no systematic deep purification solution for all the types of pollutants in the drinking water.

SUMMARY

Based on this, the purpose of the present invention is to provide a drinking water filtration device based on a graphene technologies. The filtration device can eliminate various pollutants in drinking water, kill or block various pathogenic bacteria in the drinking water and perform the characteristics and advantages of graphene nanomaterials, and has the advantages of simple structure, good filtration effect and high purification efficiency.

The present invention adopts the following technical solution:

A drinking water filtration device based on a graphene technologies comprises:
 a first filter comprising a first filter element and a first filter element casing, wherein the first filter element is disposed in the first filter element casing; the first filter element casing is provided with a water inlet and a water outlet; and the filtration material of the first filter element is any one of a monolayer graphene nanosheet, three-dimensional mesoporous graphene nanomaterial, three-dimensional macroporous graphene nanomaterial, graphene aerogel, graphene nanofiber and graphene organic framework nanocomposites;
 a second filter comprising a second filter element and a second filter element casing, wherein the second filter element is disposed in the second filter element casing; the second filter element casing is provided with a water inlet and a water outlet; the water inlet of the second filter element casing is connected with the water outlet of the first filter element casing; and the filtration material of the second filter element is a mixture of graphene oxide-superparamagnetic nanoparticles composites and graphene reinforced diatom ceramic material; and a faucet provided with a water inlet and a water outlet, wherein the water inlet of the faucet is connected with the water outlet of the second filter element casing.

The drinking water filtration device of the present invention adopts high specific surface area graphene nanomaterials as the filtration material of the first filter element to effectively absorb odor substances such as residual chlorine in the water, residual organic pollutants such as polycyclic aromatic hydrocarbon, residual insecticide, herbicide and chemical solvents, and heavy metal pollutants of lead, chromium and mercury; adopts the mixture of the graphene oxide-superparamagnetic nanoparticles composites and the graphene reinforced diatom ceramic material as the filtration material of the second filter element to fully perform the effect of killing the pathogenic bacteria through the combination of the graphene oxide and the superparamagnetic nanoparticles with good antibacterial effect; and also uses the graphene reinforced diatom ceramic material so that fine particles in the filtration material form a "microporous network" to effectively eliminate pathogenic bacteria with large volume and fully kill or block the pathogenic bacteria such as *Escherichia coli, Cholera* bacteria, *Shigella dysenteriae, Salmonella, Klebsiella* and *Schistosome* pathogens. The drinking water filtration device of the present invention can absorb the pollutants at first and then kill or block the pathogenic bacteria to achieve the purpose of fully, efficiently and deeply filtering and purifying the drinking water and fully perform the characteristics and advantages of various graphene nanomaterials. Moreover, the drinking water filtration device has the advantage of simple structure.

Further, in the filtration material of the second filter element, the weight percentage of the graphene oxide-superparamagnetic nanoparticle composites is 30%-70%; superparamagnetic nanoparticles in the graphene oxide-superparamagnetic nanoparticles composites is any one of $\alpha$-$Fe_2O_3$, $Fe_3O_4$ and nanometer yttrium oxide, and the particle size is smaller than 10 nm; and the graphene reinforced diatom ceramic material is formed by sintering diatomaceous earth, kaolin, feldspar, graphene, alumina, boron glass, talc and quartz powder.

The ratio of the graphene oxide-superparamagnetic nanoparticles composites in the filtration material of the second filter element is limited to ensure the effect of the filtration material for killing or blocking the pathogenic bacteria. Preferably, the weight ratio of the graphene oxide-superparamagnetic nanoparticles composites to the graphene reinforced diatom ceramic material is 3:7. The particle size of the superparamagnetic nanoparticles is limited to be smaller than 10 nm, so as to improve the performance of the filtration material for killing and blocking the pathogenic bacteria. The raw material of the graphene reinforced diatom ceramic material is limited, so as to effectively control the size of the "microporous network" in the filtration material and improve the performance of blocking the pathogenic bacteria.

Further, the filtration material of the first filter element is wrapped by regenerated fiber cloth or glass fiber cloth with 100-325 meshes; and the filtration material of the second filter element is wrapped by regenerated fiber cloth or glass fiber cloth with 100-325 meshes. Through the use of the regenerated fiber cloth or glass fiber cloth with 100-325 meshes, on one hand, the water can smoothly pass through the filtration material, and on the other hand, the packing density of the filtration material can be maintained, thereby avoiding reducing a purification effect caused by loose filtration material.

Further, the filtration device further comprises 6-stages polymer screens which are respectively a first-stage polymer screen, a second-stage polymer screen, a third-stage polymer screen, a fourth-stage polymer screen, a fifth-stage polymer screen and a sixth-stage polymer screen; the first-stage polymer screen and the second-stage polymer screen are stacked on the water inlet of the first filter element casing; the third-stage polymer screen is disposed on the water outlet of the first filter element casing; the fourth-stage polymer screen is disposed on the water inlet of the second filter element casing; the fifth-stage polymer screen is disposed on the water outlet of the second filter element casing; and the sixth-stage polymer screen is disposed on the water outlet of the faucet.

By arranging the 6-stages polymer screens, the purification effect of the filtration device can be enhanced to a greater extent. Moreover, the 6-stages polymer screens are respectively disposed on the water inlets or the water outlets of the first filter element casing, the second filter element casing and the faucet without the need of adding other devices. Therefore, the filtration device is ensured to have simple structure, small occupation space, high practicability and wide application range.

Further, the material of each of the polymer screens is any one of graphene/polyvinylidene fluoride composite, graphene/polytetrafluoroethylene composite and graphene/polyether-ether-ketone composite.

Further, the first-stage polymer screen has 50-100 meshes; the second-stage polymer screen has 120-250 meshes; the third-stage polymer screen has 270-325 meshes; the fourth-stage polymer screen has 400-600 meshes; the fifth-stage polymer screen has 600-2000 meshes and the sixth-stage polymer screen has 2000-8000 meshes. By reasonably designing the pore size of each of the 6-stages polymer screens, the drinking water can be filtered stage by stage, so as to achieve higher purification efficiency and also prolong the service life of each of the 6-stages polymer screens.

Further, the second filter further comprises a graphene heating film; and the graphene heating film covers an inner wall of the second filter element casing and is provided with a built-in electrode. The graphene heating film is disposed in the second filter, so as to heat the drinking water and rapidly conduct the heat, thereby facilitating a user in turning on the faucet to obtain palatable warm water.

Further, the second filter further comprises a polymer thermal insulating layer and a waterproof layer; the polymer thermal insulating layer covers the inner wall of the second filter element casing, and is located between the graphene heating film and the inner wall of the second filter element casing; and the waterproof layer covers the graphene heating film. The polymer thermal insulating layer can prevent the user from being scalded during use. The waterproof layer can effectively prevent the graphene heating film and the built-in electrode from being eroded.

Further, the material of the graphene heating film is any one of nitrogen doped graphene, tin oxide/graphene nanocomposites, and graphene-carbon nanotube composites; the material of the polymer thermal insulating layer is any one of poly-p-xylylene, polyaromatic ether, polyimide, polybenzimidazole, polyquinoline, polypyrrole, graphite type trapezoid polymer and phenanthroline trapezoid polymer; and the material of the waterproof layer is polyurethane or modified polyurethane material.

The present invention also provides a drinking water filtration method based on a graphene technology, comprising the following step: filtering drinking water through a first filtration layer and a second filtration layer successively, wherein the material of the first filtration layer is any one of a monolayer graphene nanosheet, three-dimensional mesoporous graphene nanomaterial, three-dimensional macroporous graphene nanomaterial, graphene aerogel, graphene nanofiber and graphene organic framework nanocomposites, and the material of the second filtration layer is a mixture of graphene oxide-superparamagnetic nanoparticles composites and graphene reinforced diatom ceramic material.

For better understanding and implementation, the present invention is described below in detail with reference to drawings.

DETAILED DESCRIPTION

Figure 1:
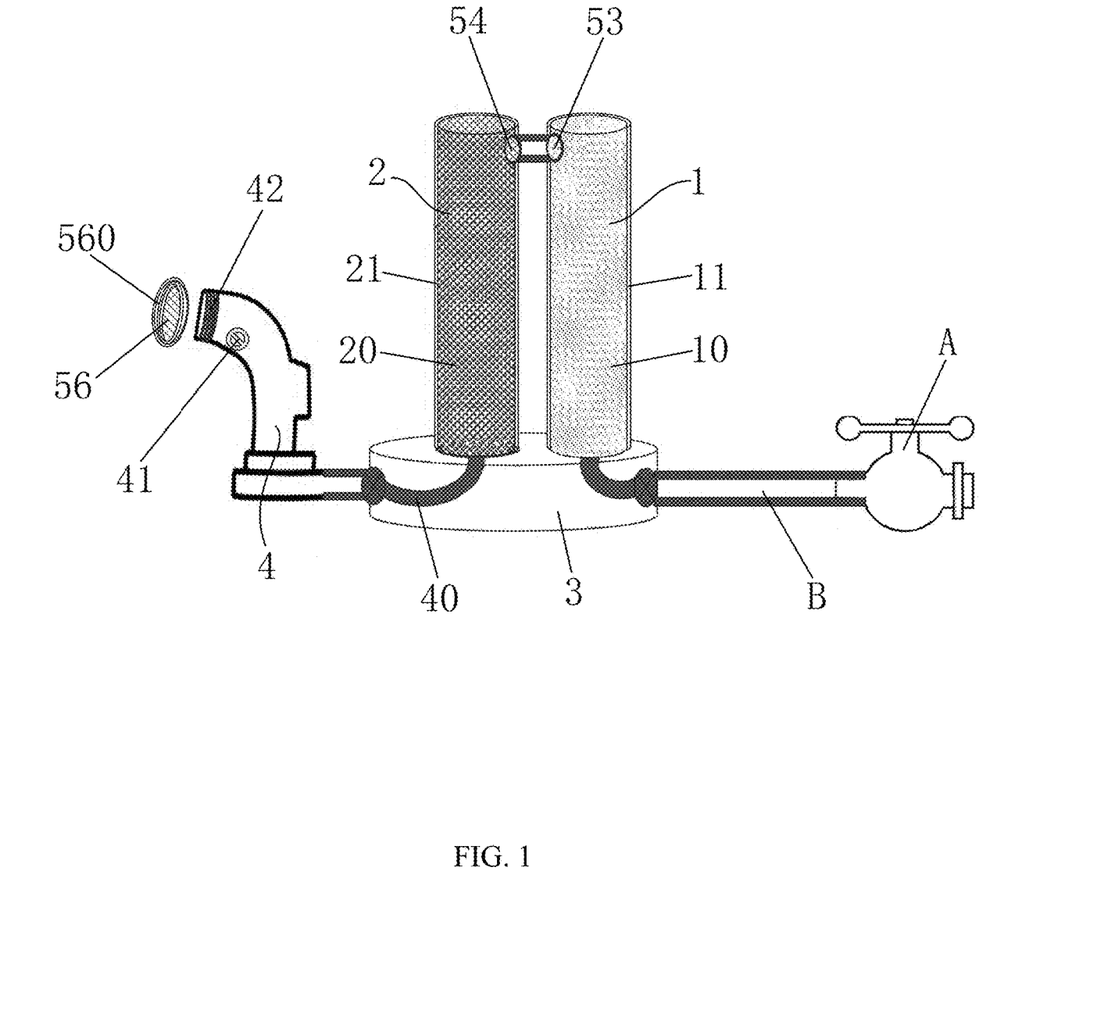
FIG. 1 is a structural schematic diagram of a drinking water filtration device based on a graphene technology in the present invention.

FIG. 1 is a structural schematic diagram of a drinking water filtration device based on a graphene technologies in the present invention. The drinking water filtration device based on the graphene technology in the present invention comprises a first filter 1, a second filter 2, a base 3, a faucet 4 and 6-stages polymer screens. The first filter 1 and the second filter 2 are installed on the base 3; and the first filter 1, the second filter 2 and the faucet 4 are connected in series.

The first filter 1 comprises a first filter element 10 and a first filter element casing 11. The first filter element 10 is disposed in the first filter element casing 11. A water inlet is formed in the bottom of the first filter element casing 11, and a water outlet is formed in the top. The first filter element casing 11 can be made of hydrophobic polymer materials with high strength and water friendliness, such as stainless steel, alloy, high strength glass, quartz, ceramics, polytetrafluoroethylene or polycarbonate, and preferably high strength glass or ceramics.

The first filter element 10 comprises a filtration material shell and filtration material filled in the filtration material shell. The filtration material shell of the first filter element 10 is slightly smaller than an inner cavity of the first filter element casing 11, is provided with uniformly distributed through holes, and has a smooth surface. The filtration material of the first filter element 10 is any one of a monolayer graphene nanosheet, three-dimensional mesoporous graphene nanomaterial, three-dimensional macroporous graphene nanomaterial, graphene aerogel, graphene nanofiber and graphene organic framework nanocomposites, and is wrapped by regenerated fiber cloth or glass fiber cloth with 100-325 meshes.

The second filter 2 comprises a second filter element 20, a second filter element casing 21, a graphene heating film 22, a polymer thermal insulating layer 23 and a waterproof layer 24. The second filter element 20 is disposed in the second filter element casing 21. A water inlet is formed in the top of the second filter element casing 21, and a water outlet is formed in the bottom. The water inlet of the second filter element casing 21 is connected with the water outlet of the first filter element casing 11. The second filter element casing 21 can be made of hydrophobic polymer materials with high strength and water friendliness, such as stainless steel, alloy, high strength glass, quartz, ceramics, polytetrafluoroethylene or polycarbonate, and preferably high strength glass or ceramics.

The second filter element 20 comprises a filtration material shell and filtration material filled in the filtration material shell. The filtration material shell of the second filter element 20 is slightly smaller than an inner cavity of the second filter element casing 21, is provided with uniformly distributed through holes, and has a smooth surface. The filtration material of the second filter element 20 is a mixture of graphene oxide-superparamagnetic nanoparticles composites and graphene reinforced diatom ceramic material, and is wrapped by regenerated fiber cloth or glass fiber cloth with 100-325 meshes. In the filtration material of the second filter element 20, the weight percentage of the graphene oxide-superparamagnetic nanoparticle composites is 30%-70%; superparamagnetic nanoparticles in the graphene oxide-superparamagnetic nanoparticles composites is any one of $\alpha\text{-}Fe_2O_3$, $Fe_3O_4$ and nanometer yttrium oxide, and the particle size is smaller than 10 nm; and the graphene reinforced diatom ceramic material is formed by sintering diatomaceous earth, kaolin, feldspar, graphene, alumina, boron glass, talc and quartz powder.

The graphene heating film 22 covers an inner wall of the second filter element casing 21 and is provided with a built-in electrode 220. The polymer thermal insulating layer 23 covers the inner wall of the second filter element casing 21, and is located between the graphene heating film 22 and the inner wall of the second filter element casing 21. The waterproof layer 24 covers the graphene heating film 22.

The material of the graphene heating film 22 is any one of nitrogen doped graphene, tin oxide/graphene nanocomposite, and graphene-carbon nanotube composite. The material of the polymer thermal insulating layer 23 is any one of poly-p-xylylene, polyaromatic ether, polyimide, polybenzimidazole, polyquinoline, polypyrrole, graphite type trapezoid polymer and phenanthroline trapezoid polymer. The material of the waterproof layer 24 is polyurethane or modified polyurethane nanomaterial.

The base 3 is used to load the first filter 1 and the second filter 2, and is provided with a power control switch. An intelligent digital display temperature controller is installed on the inner wall of the second filter element casing 21. The intelligent digital display temperature controller, the power control switch, and the built-in electrode 220 of the graphene heating film 22 are connected in series, and are electrically connected with an external power supply.

The faucet 4 is provided with a water inlet and a water outlet. The water inlet of the faucet 4 is connected with the water outlet of the second filter element casing 21 through a water outlet pipe 40. The water outlet pipe 40 is a stainless steel water pipe or a PPR water pipe. The faucet 4 is provided with an infrared sensor 41, which is convenient for controlling to turn on and turn off the water outlet by sensing the hand of a user.

The 6-stages polymer screens are respectively a first-stage polymer screen 51, a second-stage polymer screen 52, a third-stage polymer screen 53, a fourth-stage polymer screen 54, a fifth-stage polymer screen 55 and a sixth-stage polymer screen 56. The material of each of the polymer screens is any one of graphene/polyvinylidene fluoride (PVDF) composite, graphene/polytetrafluoroethylene (PTFE) composite and graphene/polyether-ether-ketone (PEEK-1000) composite.

Figure 2:
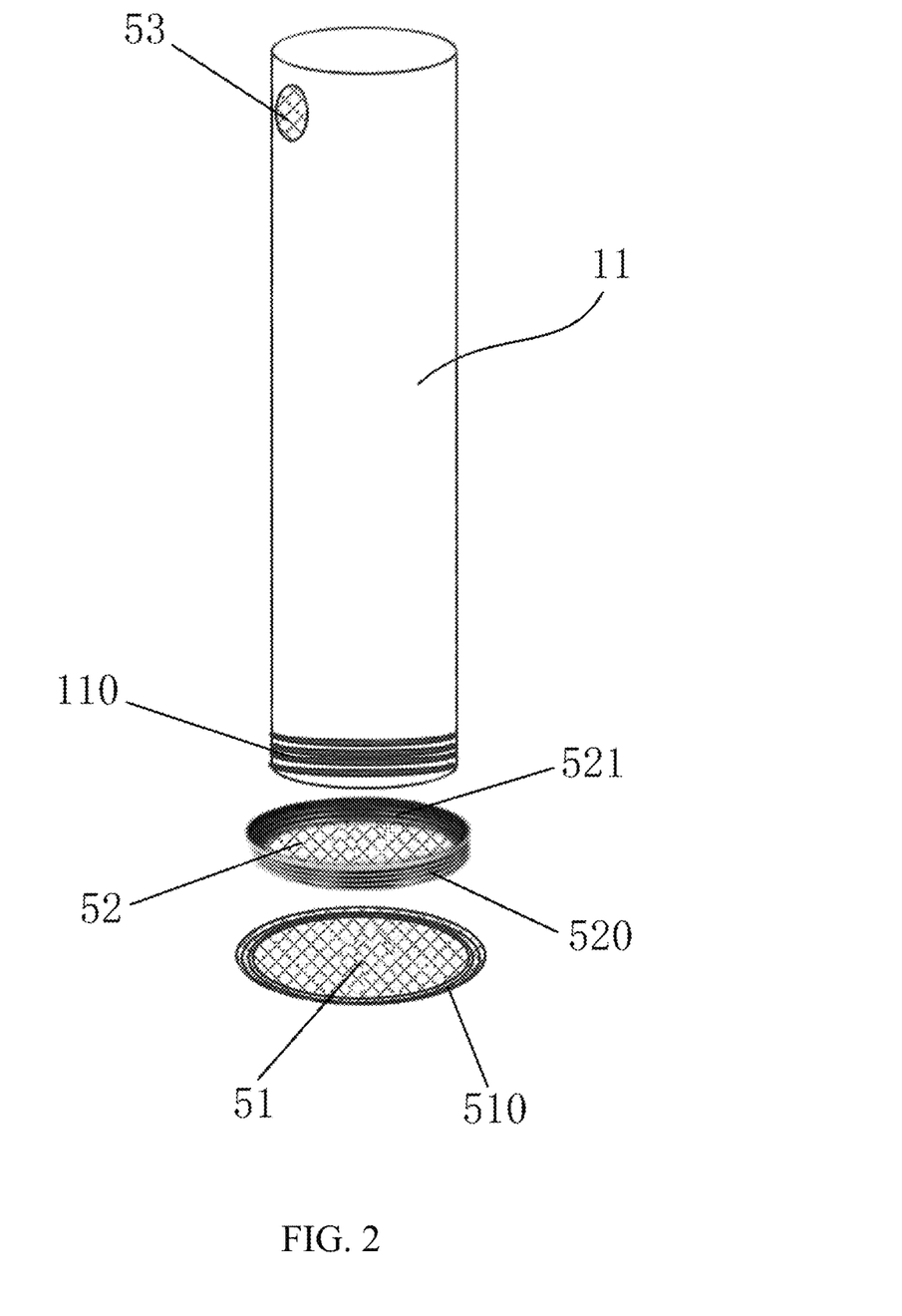
FIG. 2 is an exploded installation diagram of a first filter element casing, a first-stage polymer screen and a second-stage polymer screen.

As shown in FIG. 2, the first-stage polymer screen 51 and the second-stage polymer screen 52 are stacked at the water inlet of the first filter element casing 11 from bottom to top. A first casing external thread 110 is disposed at the outer side of the water inlet of the first filter element casing 11. The first-stage polymer screen 51 and the second-stage polymer screen 52 are circular screens. A first screen internal thread 510 is disposed at the inner side of the edge of the first-stage polymer screen 51; a second screen external thread 520 matched with the first screen internal thread 510 is disposed at the outer side of the edge of the second-stage polymer screen 52; and a second screen internal thread 521 matched with the first casing external thread 110 is disposed at the inner side of the edge of the second-stage polymer screen 52. The first-stage polymer screen 51 has 50-100 meshes; and the second-stage polymer screen 52 has 120-250 meshes.

The third-stage polymer screen 53 is disposed on the water outlet of the first filter element casing 11. A first casing internal thread is disposed at the inner side of the water outlet of the first filter element casing 11. The third-stage polymer screen 53 is a circular screen, and a third screen external thread matched with the first casing internal thread is disposed at the outer side of the edge of the third-stage polymer screen 53. The third-stage polymer screen 53 has 270-325 meshes.

The fourth-stage polymer screen 54 is disposed on the water inlet of the second filter element casing 21. A second casing internal thread is disposed at the inner side of the water inlet of the second filter element casing 21. The fourth-stage polymer screen 54 is a circular screen, and a fourth screen external thread matched with the second casing internal thread is disposed at the outer side of the edge of the fourth-stage polymer screen 54. The fourth-stage polymer screen 54 has 400-600 meshes.

Figure 3:
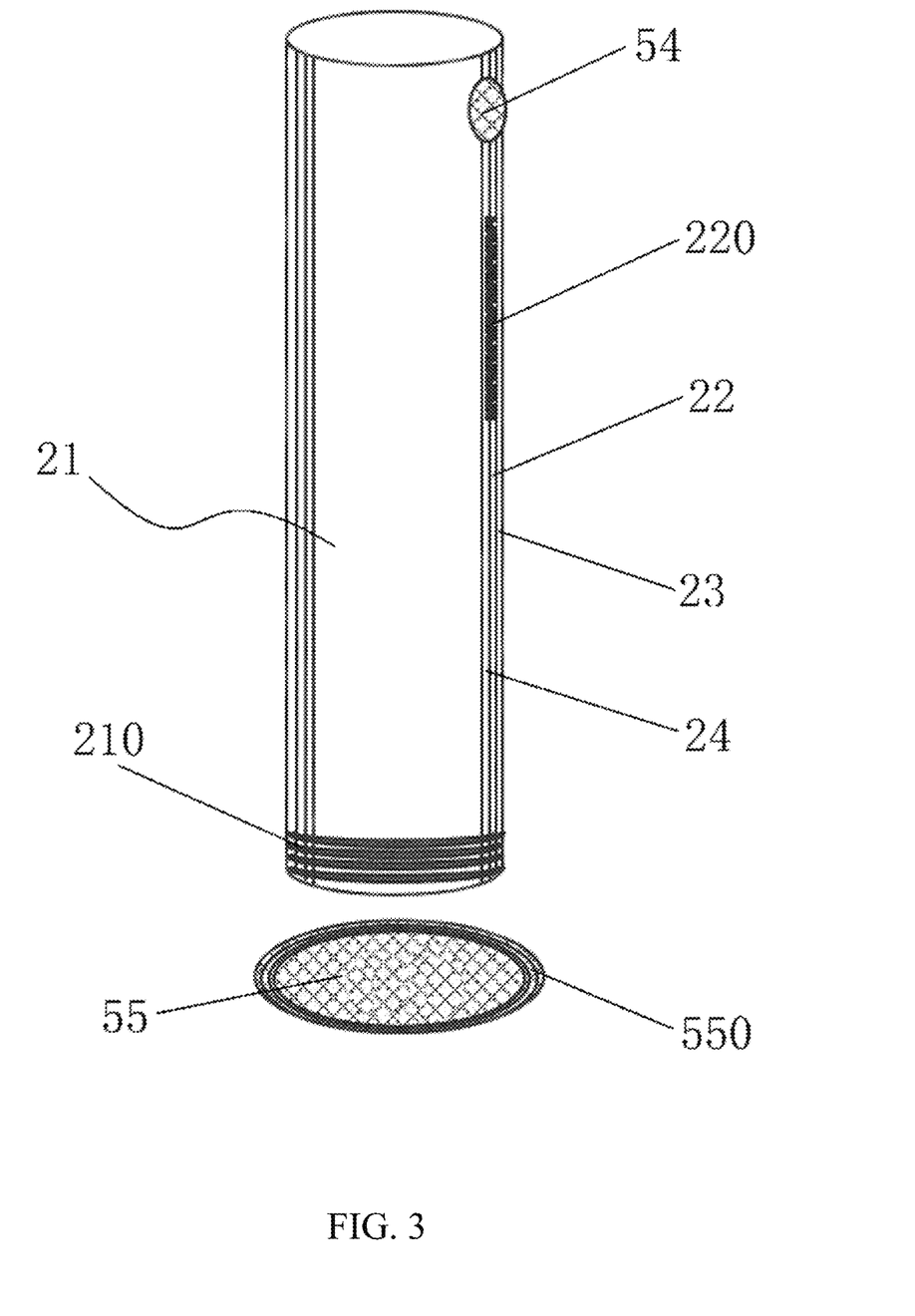
FIG. 3 is an exploded installation diagram of a second filter element casing and a fifth-stage polymer screen.

As shown in FIG. 3, the fifth-stage polymer screen 55 is disposed on the water outlet of the second filter element casing 21. A second casing external thread 210 is disposed at the outer side of the water outlet of the second filter element casing 21. The fifth-stage polymer screen 55 is a circular screen, and a fifth screen internal thread 550 matched with the second casing external thread 210 is disposed at the inner side of the edge of the fifth-stage polymer screen 55. The fifth-stage polymer screen 55 has 600-2000 meshes.

The sixth-stage polymer screen 56 is disposed on the water outlet of the faucet 4. A faucet external thread 42 is disposed at the outer side of the water outlet of the faucet 4. The sixth-stage polymer screen 56 is a circular screen, and a sixth screen internal thread 560 matched with the faucet external thread 42 is disposed at the inner side of the edge of the sixth-stage polymer screen 56. The sixth-stage polymer screen 56 has 2000-8000 meshes.

Each of the polymer screens are installed through the threads, so as to facilitate disassembly, washing and replacement.

When the drinking water filtration device of the present invention is used, a water outlet valve A of an external drinking water source is connected to the water inlet of the first filter element casing 11 through a connecting water pipe B at first; then the water outlet valve A is turned on to filter the drinking water by using the drinking water filtration device; then the faucet 4 is turned on; and the filtered and purified drinking water flows out of the water outlet of the faucet 4. Because the drinking water is filtered successively through the first-stage polymer screen 51, the second-stage polymer screen 52, the first filter element 10, the third-stage polymer screen 53, the fourth-stage polymer screen 54, the second filter element 20, the fifth-stage polymer screen 55 and the sixth-stage polymer screen 56, various pollutants are absorbed and eliminated and various pathogenic bacteria are killed or blocked. Thus, water quality after filtration and purification achieves high purity, and the drinking water can be used by the user safely. The intelligent digital display temperature controller can be adjusted to control the working state of the graphene heating film 22; and the temperature of the drinking water that flows out of the water outlet of the faucet 4 can reach a maximum of 38° C., to facilitate the user in obtaining palatable warm water.

Embodiment 1

In the present embodiment, the material of the first filter element casing 11 is stainless steel. The material of the filtration material shell of the first filter element 10 is stainless steel. The filtration material of the first filter element 10 is the three-dimensional mesoporous graphene nanomaterial, and is wrapped by regenerated fiber cloth with 200 meshes.

The material of the second filter element casing 21 is stainless steel. The material of the filtration material shell of the second filter element 20 is copper. The filtration material of the second filter element 20 is a mixture of graphene oxide-$\alpha$-$Fe_2O_3$ superparamagnetic nanoparticle composites and graphene reinforced diatom ceramic material according to a weight ratio of 30:70, and is wrapped by regenerated fiber cloth with 200 meshes. The graphene reinforced diatom ceramic material is formed by sintering the following raw materials by weight ratios: 47.0% of diatomaceous earth, 20.1% of kaolin, 13.4% of feldspar, 3.3% of graphene, 4.0% of alumina, 3.4% of boron glass, 3.4% of talc and 5.4% of quartz powder.

The material of each of the polymer screens is graphene/polyvinylidene fluoride (PVDF) composite. The first-stage polymer screen 51 has 60 meshes; the second-stage polymer screen 52 has 150 meshes; the third-stage polymer screen 53 has 270 meshes; the fourth-stage polymer screen 54 has 500 meshes; the fifth-stage polymer screen 55 has 1000 meshes; and the sixth-stage polymer screen 56 has 5000 meshes.

The material of the graphene heating film 22 is nitrogen doped graphene. The material of the polymer thermal insulating layer 23 is polyaromatic ether.

Embodiment 2

In the present embodiment, the material of the first filter element casing 11 is ceramic. The material of the filtration material shell of the first filter element 10 is ceramic. The filtration material of the first filter element 10 is the graphene organic framework composite nanomaterial, and is wrapped by glass fiber cloth with 300 meshes.

The material of the second filter element casing 21 is ceramic. The material of the filtration material shell of the second filter element 20 is carbon steel. The filtration material of the second filter element 20 is a mixture of graphene oxide-$Fe_3O_4$ superparamagnetic nanoparticle composites and graphene reinforced diatom ceramic material according to a weight ratio of 50:50, and is wrapped by glass fiber cloth with 300 meshes. The graphene reinforced diatom ceramic material is formed by sintering the following raw materials by weight ratios: 48.0% of diatomaceous earth, 21.6% of kaolin, 14.4% of feldspar, 4.1% of graphene, 2.6% of alumina, 2.4% of boron glass, 2.7% of talc and 4.2% of quartz powder.

The material of each of the polymer screens is graphene/polytetrafluoroethylene (PTFE) composite. The first-stage polymer screen 51 has 80 meshes; the second-stage polymer screen 52 has 180 meshes; the third-stage polymer screen 53 has 300 meshes; the fourth-stage polymer screen 54 has 600 meshes; the fifth-stage polymer screen 55 has 800 meshes; and the sixth-stage polymer screen 56 has 8000 meshes.

The material of the graphene heating film 22 is tin oxide/graphene nanocomposite. The material of the polymer thermal insulating layer 23 is graphite type trapezoid polymer.

Embodiment 3

In the present embodiment, the material of the first filter element casing 11 is stainless steel. The material of the filtration material shell of the first filter element 10 is high strength glass. The filtration material of the first filter element 10 is the graphene aerogel, and is wrapped by regenerated fiber cloth with 270 meshes.

The material of the second filter element casing 21 is high strength glass. The material of the filtration material shell of the second filter element 20 is aluminum nitride ceramic. The filtration material of the second filter element 20 is a mixture of graphene oxide-nanometer yttrium oxide superparamagnetic nanoparticle composites and graphene reinforced diatom ceramic material according to a weight ratio of 60:40, and is wrapped by regenerated fiber cloth with 270 meshes.

The graphene reinforced diatom ceramic material is formed by sintering the following raw materials by weight ratios: 44.8% of diatomaceous earth, 17.9% of kaolin, 13.3% of feldspar, 6.6% of graphene, 4.7% of alumina, 4.4% of boron glass, 3.1% of talc and 5.2% of quartz powder.

The material of each of the polymer screens is graphene/polyether-ether-ketone (PEEK-1000) composite. The first-stage polymer screen 51 has 100 meshes; the second-stage polymer screen 52 has 230 meshes; the third-stage polymer screen 53 has 300 meshes; the fourth-stage polymer screen 54 has 400 meshes; the fifth-stage polymer screen 55 has 1340 meshes; and the sixth-stage polymer screen 56 has 5000 meshes.

The material of the graphene heating film 22 is graphene-carbon nanotube composite. The material of the polymer thermal insulating layer 23 is polyquinoline.

The above embodiments only express several implementation modes of the present invention, and are described more specifically in detail, but shall not be consequently interpreted as a limitation to the scope of the patent for the present invention. It should be noted that, for those ordinary skilled in the art, several variations and improvements can also be made without departing from the concept of the present invention, all of which belong to the protection scope of the present invention.

What is claimed is:

1. A drinking water filtration device based on a graphene technologies, comprising:
   a first filter comprising a first filter element and a first filter element casing, wherein the first filter element is disposed in the first filter element casing; the first filter element casing is provided with a water inlet and a water outlet; and the filtration material of the first filter element is any one of a monolayer graphene nanosheet, three-dimensional mesoporous graphene nanomaterial, three-dimensional macroporous graphene nanomaterial, graphene aerogel, graphene nanofiber and graphene organic framework nanocomposites;
   a second filter comprising a second filter element and a second filter element casing, wherein the second filter element is disposed in the second filter element casing; the second filter element casing is provided with a water inlet and a water outlet; the water inlet of the second filter element casing is connected with the water outlet of the first filter element casing; and the filtration material of the second filter element is a mixture of graphene oxide-superparamagnetic nanoparticles composites and graphene reinforced diatom ceramic material; and
   a faucet provided with a water inlet and a water outlet, wherein the water inlet of the faucet is connected with the water outlet of the second filter element casing.

2. The drinking water filtration device based on the graphene technologies according to claim 1, wherein in the filtration material of the second filter element, the weight percentage of the graphene oxide-superparamagnetic nanoparticles composites is 30%-70%; superparamagnetic nanoparticle in the graphene oxide-superparamagnetic nanoparticle composites is any one of $\alpha\text{-}Fe_2O_3$, $Fe_3O_4$ and nanometer yttrium oxide, and the particle size is smaller than 10 nm; and the graphene reinforced diatom ceramic material is formed by sintering diatomaceous earth, kaolin, feldspar, graphene, alumina, boron glass, talc and quartz powder.

3. The drinking water filtration device based on the graphene technologies according to claim 1, wherein the filtration material of the first filter element is wrapped by regenerated fiber cloth or glass fiber cloth with 100-325 meshes; and the filtration material of the second filter element is wrapped by regenerated fiber cloth or glass fiber cloth with 100-325 meshes.

4. The drinking water filtration device based on the graphene technology according to claim 1, wherein the filtration device further comprises 6-stages polymer screens which are respectively a first-stage polymer screen, a second-stage polymer screen, a third-stage polymer screen, a fourth-stage polymer screen, a fifth-stage polymer screen and a sixth-stage polymer screen; the first-stage polymer screen and the second-stage polymer screen are stacked on the water inlet of the first filter element casing; the third-stage polymer screen is disposed on the water outlet of the first filter element casing; the fourth-stage polymer screen is disposed on the water inlet of the second filter element casing; the fifth-stage polymer screen is disposed on the water outlet of the second filter element casing; and the sixth-stage polymer screen is disposed on the water outlet of the faucet.

5. The drinking water filtration device based on the graphene technologies according to claim 4, wherein the material of each of the polymer screens is any one of graphene/polyvinylidene fluoride composite, graphene/polytetrafluoroethylene composite and graphene/polyether-ether-ketone composite.

6. The drinking water filtration device based on the graphene technologies according to claim 4, wherein the first-stage polymer screen has 50-100 meshes; the second-stage polymer screen has 120-250 meshes; the third-stage polymer screen has 270-325 meshes; the fourth-stage polymer screen has 400-600 meshes; the fifth-stage polymer screen has 600-2000 meshes; and the sixth-stage polymer screen has 2000-8000 meshes.

7. The drinking water filtration device based on the graphene technologies according to claim 1, wherein the second filter further comprises a graphene heating film; and the graphene heating film covers an inner wall of the second filter element casing and is provided with a built-in electrode.

8. The drinking water filtration device based on the graphene technologies according to claim 7, wherein the second filter further comprises a polymer thermal insulating layer and a waterproof layer; the polymer thermal insulating layer covers the inner wall of the second filter element casing, and is located between the graphene heating film and the inner wall of the second filter element casing; and the waterproof layer covers the graphene heating film.

9. The drinking water filtration device based on the graphene technologies according to claim 8, wherein the material of the graphene heating film is any one of nitrogen doped graphene, tin oxide/graphene nanocomposite, and graphene-carbon nanotube composite; the material of the polymer thermal insulating layer is any one of poly-p-xylylene, polyaromatic ether, polyimide, polybenzimidazole, polyquinoline, polypyrrole, graphite type trapezoid polymer and phenanthroline trapezoid polymer; and the material of the waterproof layer is polyurethane or modified polyurethane material.

10. A drinking water filtration method based on a graphene technologies, comprising the following step: filtering drinking water through a first filtration layer and a second filtration layer successively, wherein the material of the first filtration layer is any one of a monolayer graphene nanosheet, three-dimensional mesoporous graphene nanomaterial, three-dimensional macroporous graphene nanomaterial, graphene aerogel, graphene nanofiber and graphene organic framework nanocomposites, and the material of the second filtration layer is a mixture of graphene oxide-superparamagnetic nanoparticles composites and graphene reinforced diatom ceramic material.

* * * * *